United States Patent [19]

Hayashi et al.

[11] Patent Number: 5,261,108

[45] Date of Patent: Nov. 9, 1993

[54] MULTIPROCESSOR COMMUNICATIONS REGISTER PROVIDING COMPLETE ACCESS IN A FULL ACCESS MODE, AND MAPPED ACCESS IN A PARTIAL ACCESS MODE

[75] Inventors: Hideo Hayashi, Tokyo; Atsuo Mochizuki, Yamanashi; Ryuji Kobayashi, Tokyo; Chiaki Kumamoto, Tokyo; Reiko Kokubu, Tokyo, all of Japan

[73] Assignee: NEC Corporation, Tokyo, Japan

[21] Appl. No.: 995,907

[22] Filed: Dec. 22, 1992

Related U.S. Application Data

[63] Continuation of Ser. No. 418,030, Oct. 10, 1989, abandoned.

[30] Foreign Application Priority Data

| Oct. 8, 1988 | [JP] | Japan | 63-252904 |
| Oct. 27, 1988 | [JP] | Japan | 63-269577 |
| Oct. 27, 1988 | [JP] | Japan | 63-269578 |
| Oct. 27, 1988 | [JP] | Japan | 63-269579 |
| Oct. 27, 1988 | [JP] | Japan | 63-269580 |
| Oct. 27, 1988 | [JP] | Japan | 63-269581 |

[51] Int. Cl.⁵ .................. G06F 13/14; G06F 12/06
[52] U.S. Cl. .................... 395/725; 395/425; 364/242.6; 364/242.91; 364/255.1; 364/255.5; 364/DIG. 1
[58] Field of Search .............. 395/725, 325, 425

[56] References Cited

U.S. PATENT DOCUMENTS

| 4,214,304 | 7/1980 | Shimizu et al. | 364/200 |
| 4,308,580 | 12/1981 | Ohtaki | 364/200 |
| 4,419,724 | 12/1983 | Branigin et al. | 364/200 |
| 4,574,350 | 3/1986 | Starr | 364/200 |
| 4,754,398 | 6/1988 | Pribnow | 364/200 |
| 4,979,105 | 12/1990 | Daly et al. | 395/575 |
| 4,984,153 | 1/1991 | Kregness et al. | 364/200 |
| 4,989,178 | 1/1991 | Shonaka | 364/900 |
| 5,050,070 | 9/1991 | Chastin et al. | 364/200 |
| 5,115,499 | 5/1992 | Stiffler et al. | 395/425 |

OTHER PUBLICATIONS

J. Lum IBM Technical disclosure bulletin, vol. 13, No. 12, may 1971, pp. 3799-3800 "Deadlock detection and breaking".

Primary Examiner—Parshotam S. Lall
Assistant Examiner—Richard Lee Ellis
Attorney, Agent, or Firm—Foley & Lardner

[57] ABSTRACT

In a multiprocessor system, a communication register is partitioned into groups of word storage locations and one of the groups is further partitioned into subgroups associated respectively with the processors. An access controller accesses any groups of the communication register when a system program is being processed and accesses one of the subgroup when a user program is being processed. A write controller is responsive to a test & set instruction of first occurrence from a common bus for assembling a lock work with a data word, a control field and a counter field containing a variable count. The control field of the lock word is set to a first binary state when it is assembled and reset to a second binary state when deassembled. In response to a load instruction from the common bus, either the data word from the bus or lock word is stored into a specified storage area of a communication register. A read controller reads contents of an addressed location of the communication register onto the common bus in response to a save instruction. Test & set instruction of a subsequent occurrence causes the variable count in the stored lock word to be decremented as long as the control field remains set to the first binary state. When the count reduces to zero, a signal is applied to the common bus indicating the occurrence of a dead lock.

3 Claims, 6 Drawing Sheets

MULTIPROCESSOR COMMUNICATIONS REGISTER PROVIDING COMPLETE ACCESS IN A FULL ACCESS MODE, AND MAPPED ACCESS IN A PARTIAL ACCESS MODE

This application is a continuation of application Ser. No. 07/418,030, filed Oct. 10, 1989, now abandoned.

BACKGROUND OF THE INVENTION

The present invention relates to multiprocessor systems.

The design purpose of a multiprocessor system is generally to increase system throughput, but in some cases it is aimed at reducing a job's turnaround time. If a job has independent tasks, the turnaround time of the job can be reduced by performing parallel processing on the whole or part of the job. In some types of parallel processing, there is a special kind of data that must be synchronized between tasks or shared by more than one processor. Such data must be used exclusively by one processor. For such purposes, a lock word is stored in a main memory. When a processor attempts to access the exclusive data, it sets the lock word if it is not set so as to obtain the right to access. Any of the other processors accessing the exclusive data examine the status of the lock word, and if it has been already set, the processor is denied access to that data until the lock word is reset. Since the lock word is stored in the main memory, there is an inherent delay in the transfer of data, thus placing a limit for the highest speed with which data can be transferred between processors. In addition to this, a dead lock condition can occur when a processor fails to reset the lock word.

SUMMARY OF THE INVENTION

It is therefore an object of the present invention to provide a multiprocessor system which allows high speed data transfer between multiple processors by writing a lock word into a communication register.

Another object of the present invention is to provide a multiprocessor system which eliminates dead lock conditions which might otherwise occur as a result of a processor failing to reset a lock word.

According to a first aspect of the present invention, a communication register is connected to a common bus, the communication register being partitioned into a plurality of groups of word storage locations. One of the groups is further partitioned into a plurality of subgroups associated respectively with the processors. An access controller accesses one of the word storage locations of all the groups of the communication register in accordance with a first address code of a longer bit length supplied from the common bus when the granted processor is processing a system program and for accessing a storage location of one of the subgroups in accordance with a second address code of a shorter bit length supplied from the common bus and contents of directories which are associated respectively with the processors when the granted processor is processing a user program. A write controller writes a data word of the longer bit length from the common bus into a word storage location of the communication register specified by the access controller and forms a lock word with a data word of the shorter bit length from the common bus and writes the lock word into a specified word storage location of the communication register. A read controller reads out the contents of a storage location in the communication register specified by the access controller and forwards them onto the common bus.

According to a second aspect, the access controller accesses a specified storage area of the communication register in accordance with an address code supplied from the common bus. A write controller is responsive to a test & set instruction of first occurrence from the common bus for assembling a lock word with an exclusive data word supplied from the common bus, a control field and a counter field containing a variable count. The control field of the lock word is set to a first binary state when the lock word is assembled and reset to a second binary state when the lock word is disassembled. The write controller is further responsive to a load instruction from the common bus for writing a nonexclusive data word received from the bus as well as the lock word into a storage area of the communication register specified by the address controller. In response to a save instruction, a read controller reads a word out of the communication register onto the common bus. Responsive to the test & set instruction of a subsequent occurrence from the common bus, the count value in the stored lock word is varied by a predetermined amount as long as the control field remains set to the first binary state. A detector is provided to apply a signal to the common bus indicating the occurrence of an abnormal condition when the count value attains a predetermined value.

BRIEF DESCRIPTION OF THE DRAWINGS

The present invention will be described in further detail with reference to the accompanying drawings, in which.

DETAILED DESCRIPTION

Figure 1:
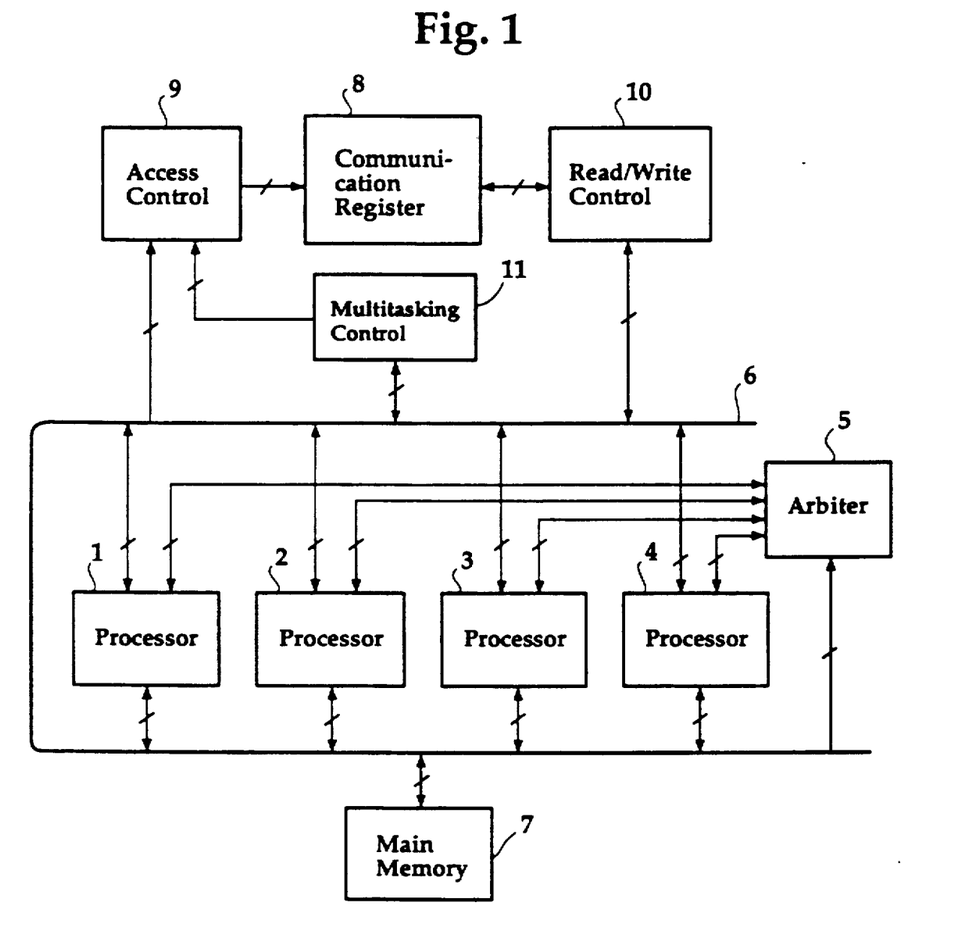
FIG. 1 is a block diagram of a multiprocessor system according to the present invention.

Referring now to FIG. 1, there is shown a multiprocessor system according to an embodiment of the present invention. Four processors 1, 2 3 and 4 are provided. A bus arbiter 5 receives a request from the processors when they attempt to access a common bus 6. Permission is granted to only one processor if there is more than one competing processor. Through the common bus 6, each processor communicates with a main memory 7 and a communication register 8 for exchanging data with other processors. An access controller 9 and a read/write controller 10 are connected to the common bus 6 to access the communication register 8 and write data from a granted processor into a specified word location of the communication register 8 and read it from a specified area of the register 8. A multitasking controller 11 is further connected between bus 6 and access controller 9 to permit multitasking operations to be performed between the processors in a master-slave relationship.

Figure 2A:
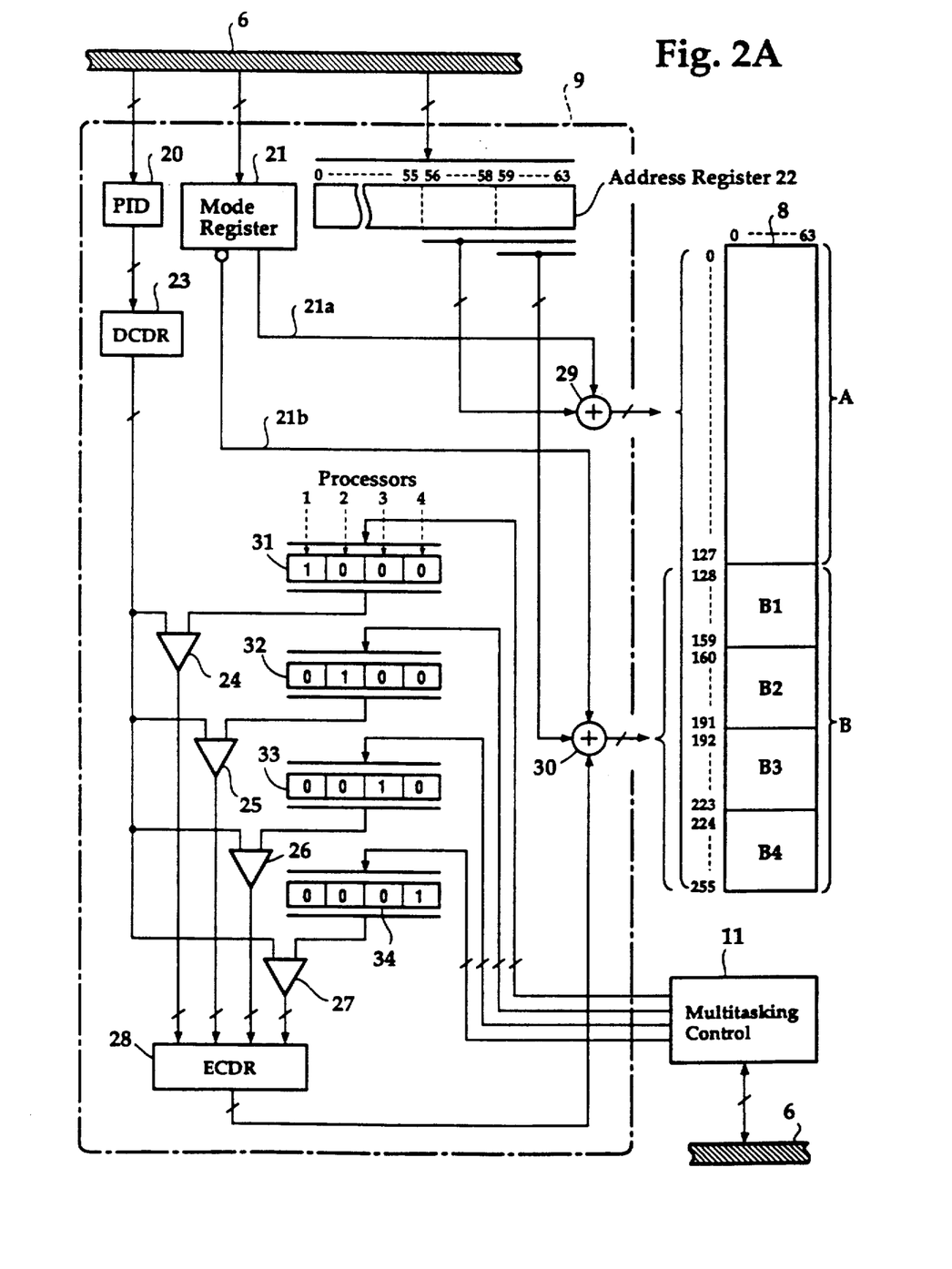
FIG. 2A is a block diagram of the communication register and the address controller of FIG. 1.

As illustrated in FIG. 2A, the communication register 8 is partitioned into 256 words of 64 bits each. The register 8 is divided into a group A of #0 to #127 words and a group B of #128 to #255 words. Group B of the register 8 is further divided into subgroups B1 (#128 to #159), B2 (#160 to #191), B3 (#192 to #223) and B4 (#224 to #255).

Access controller 9 comprises a processor identifier register 20, a mode register 21 and a 64-bit address register 22, all of which are connected to the common bus 6 to receive and store data supplied from a processor to which permission is granted from the bus arbiter 5. The identifier of the accessing processor is stored in the processor identifier register 20, and a mode identifier bit of the processor is stored in the mode register 21. When the processor is performing a system program, it is said to be in a high-priority mode and a logical 1 is stored in the mode register 21 and when performing a user program it is said to be in a low-priority mode and a logical 0 is stored in the register 21. Mode register 21 has output leads 21a and 21b which are connected to adders 29 and 30, respectively. During the high-priority mode, the mode register outputs at leads 21a and 21b are logical 1 and 0, respectively, and during the low-priority mode, the logical levels at leads 21a and 21b are at 0 and 1, respectively.

To permit full access to the whole area of communication register 8 when the system program is being executed, an 8-bit address data is stored in the #56 to #63 bit positions of the 64-bit address register 22 which are connected to adder 29. The output of adder 29 is supplied to the communication register 8 to access any of the 256 word locations of the communication register 8.

Partial access to the register 8 is given to a processor when executing a user program. In this case, a 5-bit address code is stored in the #59 to #63 bit positions of the address register 22 to identify any one of 32 word locations of a subgroup which is addressed. These bit positions are connected to an adder 30 to which the output lead 21b of mode register 21 is also connected. The output of processor identifier register 20 is translated by a decoder 23 into a 4-bit code which is supplied to comparators 24, 25, 26 and 27 for comparison with 4-bit codes supplied respectively from communication register directories 31, 32, 33 and 34 which are, in turn, associated with subgroups B1, B2, B3 and B4 of the communication register 8, respectively.

Each of the directories 31, 32, 33 and 34 has four bit positions. Normally, a logical 1 is set into the first (leftmost) bit position of directory 31, the second bit position of directory 32, the third bit position of directory 33 and the fourth (rightmost) bit position of directory 34 as illustrated in FIG. 2A. The bit position of each directory in which a logical 1 is stored identifies the processor with which the directory is associated, so that directories 31, 32, 33 and 34 are normally associated with processors 1, 2, 3 and 4, respectively. Since directories 31 to 34 are associated with subgroups B1 to B4, respectively, processors 1 to 4 are normally associated with subgroups B1 to B4, respectively.

Each of the comparators 24 to 27 produces a logical-1 output when there is a match between the input from the decoder 23 and the input from the associated directory and produces a logical 0 output when there is no match between them. A 4-bit code is thus formed by the outputs of comparators 24 to 27 and translated by an encoder 28 into a 2-bit subgroup identifying code, which is applied to the adder 30 and appended with the 5-bit word identifying code from register 22 to access any location of a specified one of subgroups B1 through B4. To the leftmost position of the 5-bit code is appended a logical 1 which is supplied from the mode register 21 during a low-priority mode. With a word location of the communication register 8 being identified by the access controller 9, a 64-bit word can be exchanged between a processor and the communication register. This operation is handled by the read/write controller 10 of FIG. 2B.

Figure 2B:
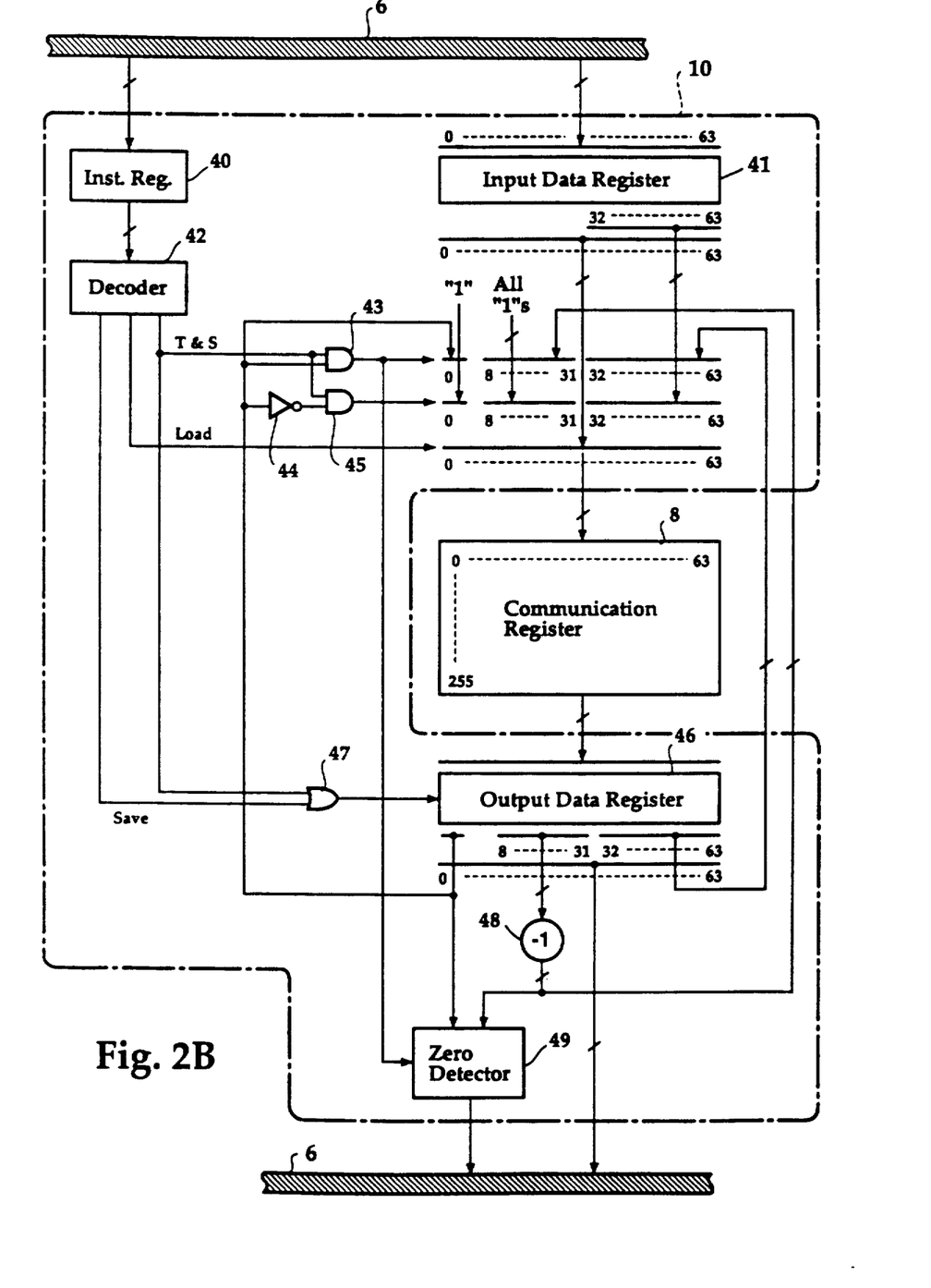
FIG. 2B is a block diagram of the communication register and the read/write controller of FIG. 1.

Read/write controller 10 includes an instruction register 40 and a 64-bit input data register 41 both of which are connected to the bus 6. Instruction register 40 receives three types of instruction from the processors, which are SAVE, LOAD and TEST & SET instructions. Input data register 41 receives a 64-bit data word or a 32-bit "exclusive" data word from the bus 6. An output data register 46 is connected to the communication register 8 to store a data word or a lock word and transfers them to the bus 6 in response to an output from an OR gate 47 to which SAVE and TEST & SET instructions are supplied from a decoder 42.

Data stored in the instruction register 40 is examined by decoder 42 to selectively control the data stored in the input data register 41, depending on whether the instruction is LOAD or TEST & SET as well as on the logical state of the #0 bit position of the output data register 46.

The #0 bit position of the output data register 46 is connected to a zero detector 49 as well as to an AND gate 43 and an inverter 44, and further to the #0 bit position of the input of communication register 8. The #8 to #31 bit positions of the output data register 46 are connected to a decrement circuit 48 whose outputs are connected to the #8 to #31 bit positions of the input of communication register 8 as well as to the zero detector 49. The #32 to #63 bit positions of the output data register 46 are connected to the corresponding bit positions of communication register 8.

Figure 3:
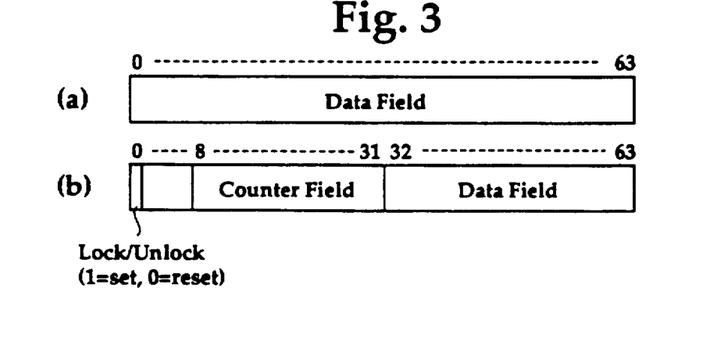
FIG. 3 consisting of (a) and (b), shows formats of data stored in the communication register of FIG. 2A.

Each of the 64-bit words stored in the communication register 8 may be of a 64-bit length data word format as shown in part (a) of FIG. 3, or of a lock word format as shown in part (b) of FIG. 3. In the former case, the communication register 8 is used as a data register and in the latter case, the data word is partitioned into a lock/unlock bit position (#0), a 24-bit counter field (#8 to #31 bit positions) and a 32-bit data field (#32 to #63 bit positions). The lock/unlock bit is set to logical 1 when exclusive control is being carried out and is reset to logical 0 when exclusive control is released.

If the input data is a 64-bit data word, it is supplied to the communication register 8 and if it is a 32-bit "exclusive" data word, a lock/unlock bit and a counter field are appended to it to form a lock word. In response to a LOAD instruction the contents of the input data register 41 are loaded into a word location of the communication register 8 which is specified by the access controller 9 in a manner as described previously.

If a logical 0 is stored in the #0 bit position of a lock word, a logical 0 appears in the #0 bit position of the output data register 46. A TEST & SET instruction from decoder 42 causes the output data register 46 to read the stored lock word, so that AND gate 45 is activated to set a logical 1 into the #0 position of the input of communication register 8, and set all 1's into the #8 to #31 bit positions of the register 8 input. In this instance, the #32 to #63 bit input positions are filled with data bits of a 32-bit "exclusive" data word. In this way, a new lock word is assembled with a counter field set with a maximum count value. In response to a TEST & SET instruction, this lock word is stored into a specified location of the communication register 8. The processor, which has issued this TEST & SET instruction, receives this lock word and checks its #0 bit position in response to receipt of a subsequent command to see whether the attempt to set a lock word has been successful or failed. If the attempt has failed, the processor generates a TEST & SET instruction again to repeat the above process until the stored lock word is reset by another processor which has set it previously.

With a logical 1 being set in the #0 bit position of a lock word, a logical 1 appears in the #0 bit position of output data register 46. A subsequent TEST & SET instruction from a processor causes the output data register 46 to read a stored lock word from register 8 and deactivates AND gate 45 and activates AND gate 43. As a result, the count value set in the counter field (#8 to #31 bit positions) of the lock word is decremented by one in the decrement circuit 48, and communication register 8 receives the outputs of decrement circuit 48 and an "exclusive" data word from the #32 to #63 bit positions of output data register 46. The contents of the output data register 46 are therefore updated and stored again into the communication register 8. It is seen therefore that the value set in the counter field of a lock word is reduced to zero when it has been decremented $2^{24}$ times from the initial value each time the communication register 8 is accessed with a TEST & SET instruction.

In response to a SAVE instruction, the output data register 46 transfers the contents of the output data register 46 to the bus 6.

Zero detector 49 is enabled in response to the output of AND gate 43 to supply a signal to the bus 6 indicating the occurrence of a deadlock condition when the logical value decremented by the decrement circuit 48 is reduced to zero. When this occurs, the processor of interest enters a subroutine to remove the deadlock condition.

Figure 4:
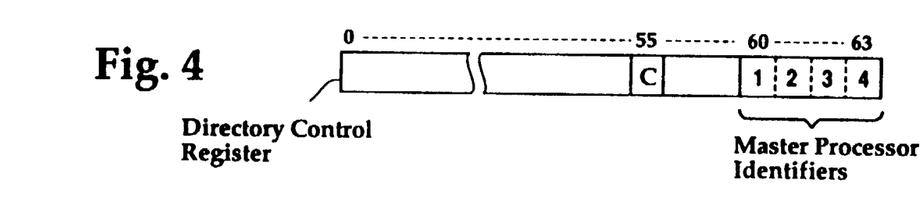
FIG. 4 shows a format of data stored in a directory control register of the multitasking controller of FIG. 2A.
Figure 5A:
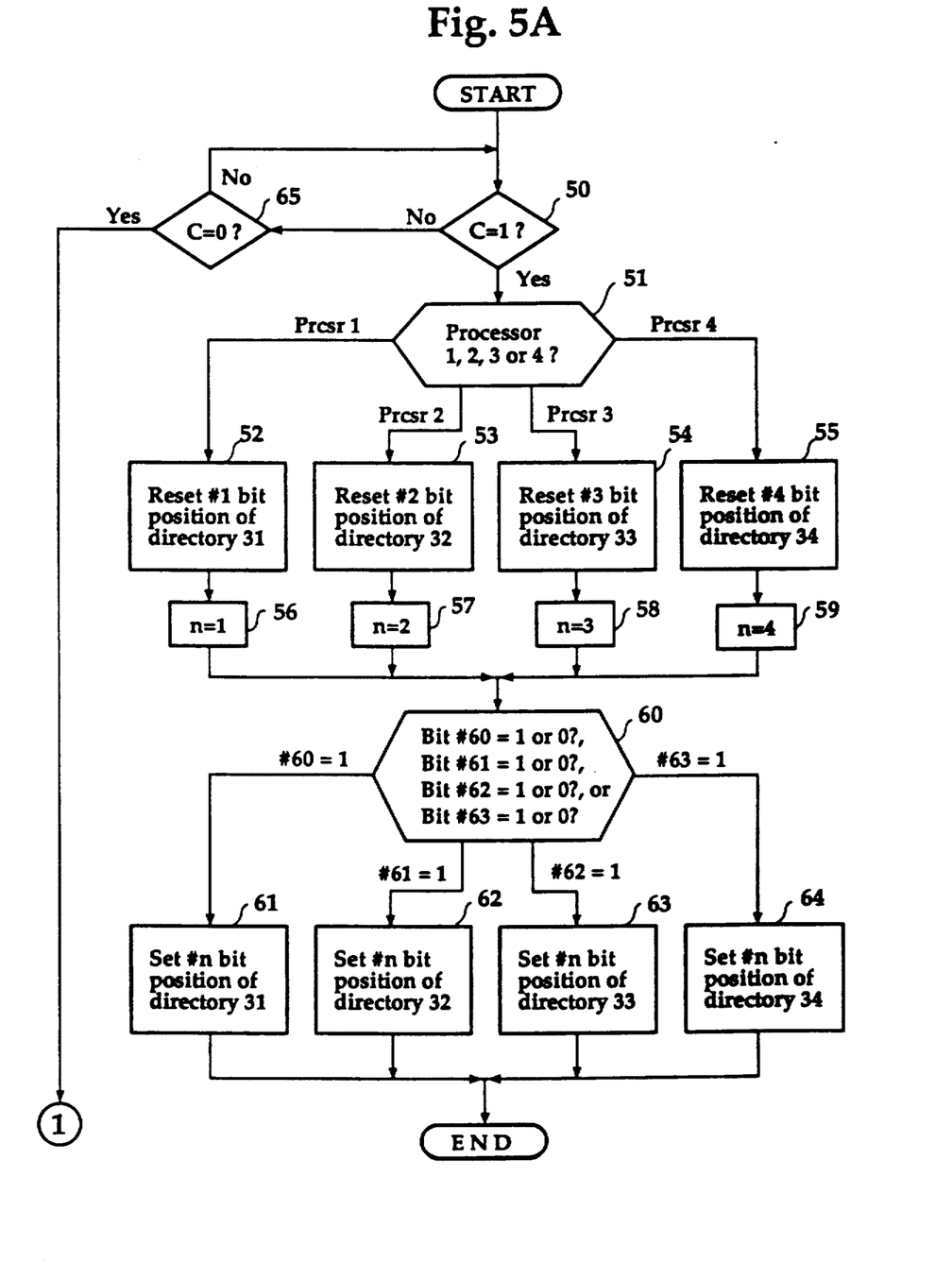
FIGS. 5A and 5B are flowcharts describing a sequence of operations performed by the multitasking controller.
Figure 5B:
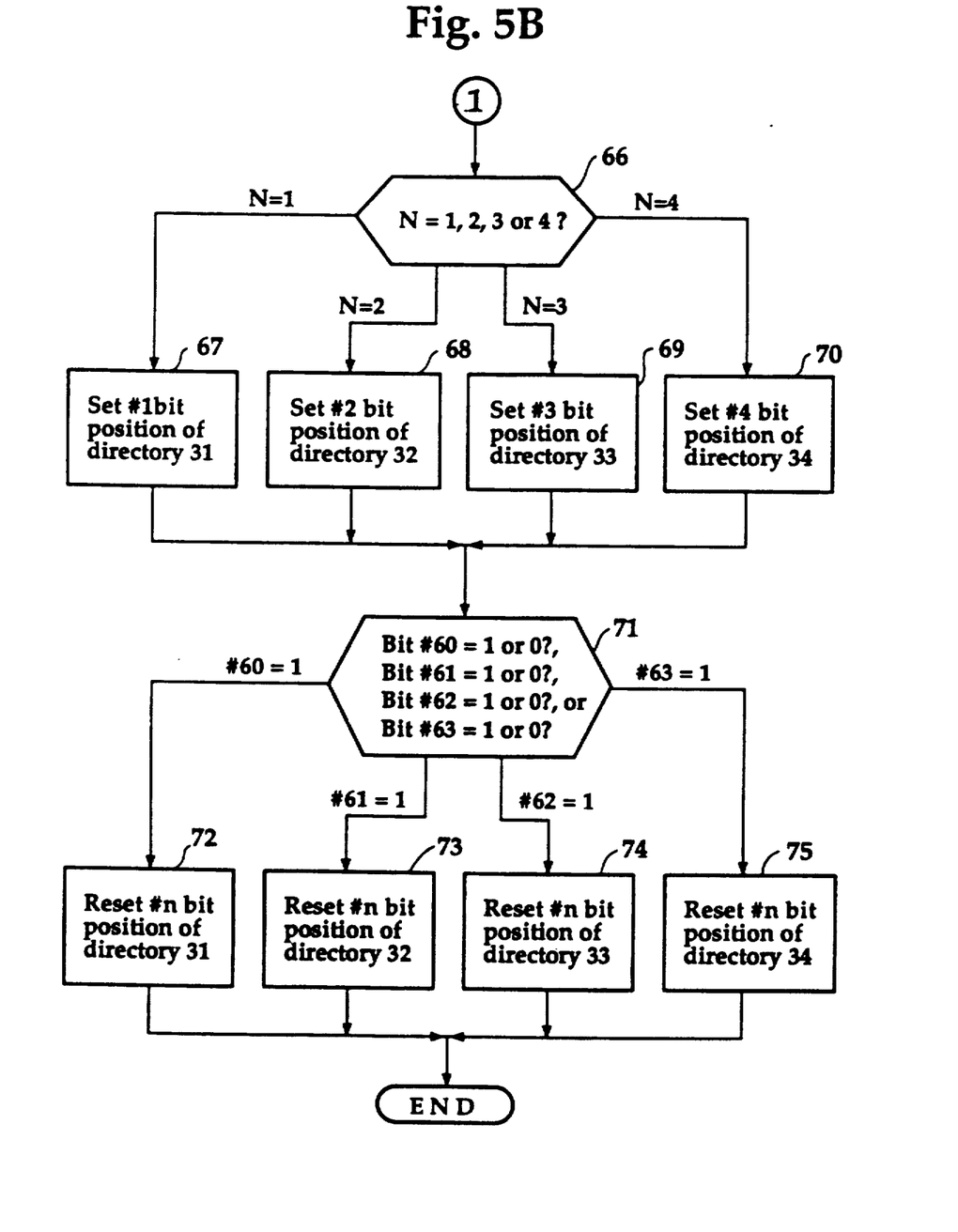

The contents of communication register directories 31 through 34 are controlled by a 64-bit directory control instruction supplied from a processor to a directory control register contained in the multitasking controller 11 as shown in FIG. 4. The directory control instruction data includes a control bit in the #55 bit position and master processor identifiers in the #60 to #63 bit positions associated respectively with processors 1, 2, 3 and 4. A logical 1 in the #60 to #63 bit positions of the directory control data indicates that a master processor is one that is associated with that bit location. As shown in FIGS. 5A and 5B, multitasking controller 11 is programmed to perform directories set and reset operations.

In FIG. 5A, the program starts with decision block 50 which examines the control bit (C) to check to see if it is logical 1 or 0. If C=1, exit is to decision block 51 to determine which one of the processors has been granted access to the communication register 8. Depending on the identified processor number control exits to one of operations blocks 52 to 55 to reset the corresponding bit position of a respective one of the directories 31 to 34. Following blocks 52 to 55, exit is to one of blocks 56 to 59 associated respectively with blocks 52 to 55 to set a variable n with a processor identifier detected by block 51. Control then exits to decision block 60 to detect which one of the #60 to #63 bit positions of the directory control data is set to logical 1. Depending on the decision made by block 60, control proceeds to one of operations blocks 61 to 64 to set the #n bit position of a respective one of the directories.

Figure 6:
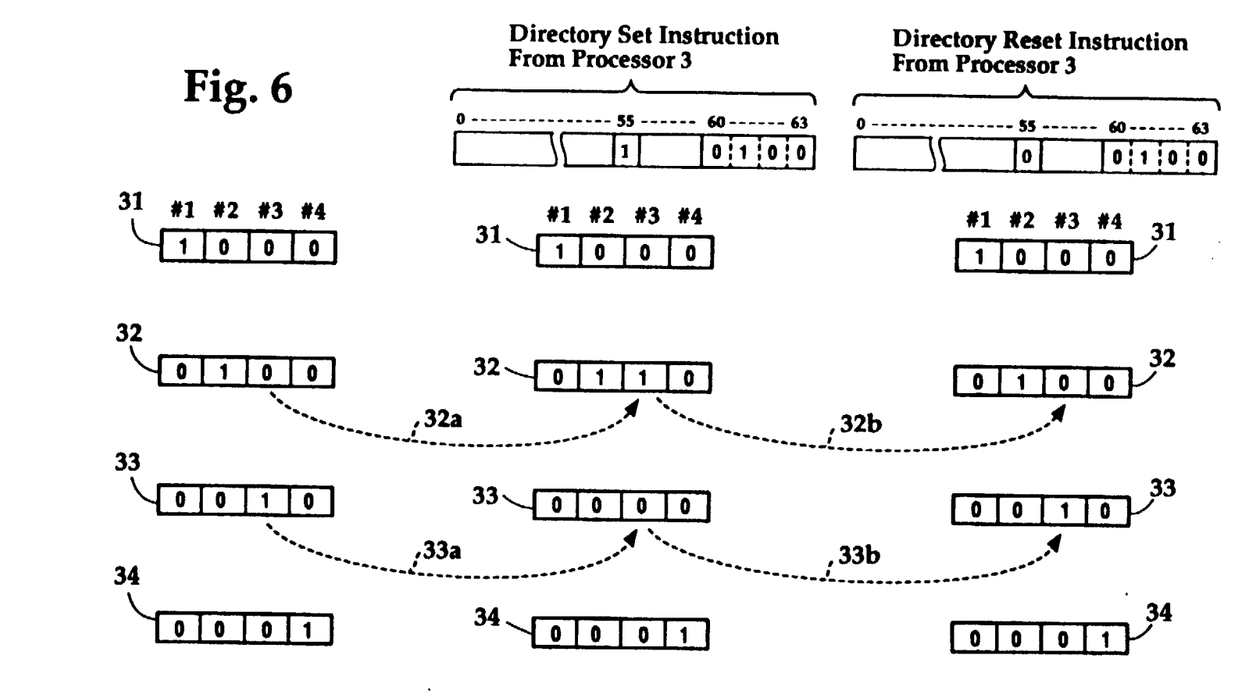
FIG. 6 is a schematic illustration of the contents of communication register directories used in a multitasking environment.

If, for example, processor 3 acts as a slave processor performing a multitasking operation with processor 2 which acts as a master processor, the control bit of a directory set instruction from processor 3 is set to 1 as shown in FIG. 6, and control exits from block 51 to block 54 to reset the #3 bit position of directory 33 to 0 as indicated by a dotted line 33a in FIG. 6. Control advances to block 58 to set n to 3. Since processor 2 is the master processor, a 1 is set in the #61 bit position of the directory control data and control exits to block 62 to set a 1 into #2 bit position of directory 32 as indicated by a dotted line 32a. In this way, the #2 and #3 bit positions of directory 32 are set with a logical 1. The contents of these bit positions accessed by processors 2 and 3 to perform a multitasking operation.

When resetting the contents of directory 32, a directory reset instruction containing C=0 is supplied from processor 3 to the directory control register of multitasking controller 11 as shown in FIG. 6. In FIG. 5A, the program restarts with decision block 65 for checking to see if C=0. Exit then is to decision block 66 (FIG. 5B) to determine whether the variable n is 1, 2, 3 or 4. Depending on the variable n, control exits to one of operations blocks 67 to 70 to set a bit position of a respective one of the directories 31 to 34 corresponding to the variable n. Following blocks 67 to 70, exit is to decision block 71 to detect which one of the #60 to #63 bit positions of the directory reset instruction is set with a logical 1. Depending on the decision made by block 60, control proceeds to one of operations blocks 72 to 75 to reset the #n bit position of a respective one of the directories.

Therefore, in reponse to the directory reset instruction from processor 3, control exits from block 66 to block 68 to set the #3 bit position of directory 33 to 1 as indicated by a dotted line 33b. Control advances to block 73 to reset #2 bit position of directory 32 to 0 as indicated by a dotted line 32b. In this way, directories 32 and 33 are reset to normal to terminate the multitasking operation.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A multiprocessor system having an arbiter for selecting a processor accessing a common bus, said system comprising:
   a plurality of processors connected to said common bus and said arbiter, each of said processors generating a full access code if said processor is selected by said arbiter during a full access mode and a partial access code if said processor is selected by said arbiter during a partial access mode;
   a main memory connected to said common bus for storing data;

a communication register connected to said common bus, said communication register being divided into first and second partitions, said second partition being divided into subpartitions corresponding to said plurality of processors;

full access control means connected to said common bus for specifying a storage location in any of said first and second partitions in response to said full access code from said selected processor;

a plurality of directories corresponding respectively to said subpartitions, each of said directories having bit positions corresponding respectively to said plurality of processors;

directory control means connected to said common bus for setting a bit in a bit position of said directories corresponding to said selected processor;

partial access control means connected to said common bus and said directories for identifying one of said subpartitions for access when said directory corresponding to said identified subpartition has a bit set in a bit position corresponding to said selected processor and specifying a storage location in said identified subpartition in response to said partial access code from said selected processor; and read/write control means connected to said common bus and responsive to an instruction from said selected processor for writing data from said main memory into, and reading data from, a storage location of said communication register specified by said full or partial access control means.

2. A multiprocessor system as recited in claim 1, wherein said read/write control means comprises:

input means connected to said common bus for receiving a data word from said main memory;

instruction decoder means connected to said common bus for detecting a write instruction, a read instruction, and a load instruction issued from said selected processor;

logic means responsive to said write instruction for assembling a lock word in said input means with said received data word and a count value, responsive to said load instruction for loading contents of said input means into a storage location of said communication register specified by said partial access control means, and responsive to said read instruction for reading contents of a storage location of said communication register specified by said partial access control means onto said common bus, updating said count value of a lock word of said read contents, and rewriting said updated lock word into said specified location of said communication register; and count detector means for detecting when said count value of a lock word of said read contents reaches a predetermined value and applying a signal to said common bus indicating that an abnormal condition has occurred.

3. A multiprocessor system as recited in claim 2, wherein said read/write control means further comprises means for inserting a lock bit into said lock word in response to said write instruction from said selected processor to exclusively allow only one processor to access said lock work and inserting an unlock bit when said lock word is disassembled.

* * * * *